Jan. 25, 1944.　　　C. P. CUENI ET AL　　　2,340,176
SHEAR REINFORCED COMPOSITE STRUCTURE
Filed March 23, 1942　　　2 Sheets-Sheet 1

INVENTORS.
CLEMENT PAUL CUENI
ERNEST WALTER
BY

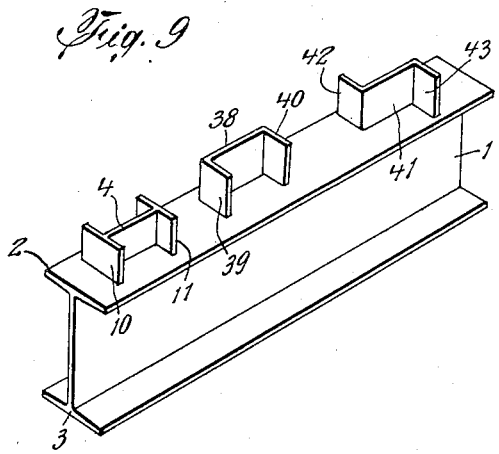
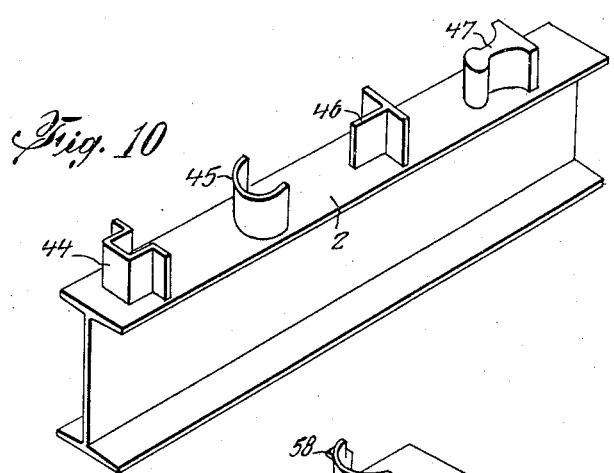
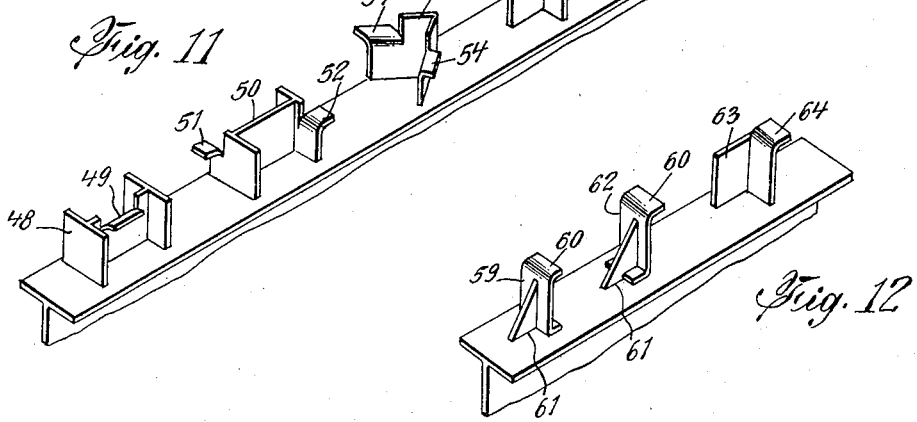

Patented Jan. 25, 1944

2,340,176

UNITED STATES PATENT OFFICE 2,340,176

SHEAR REINFORCED COMPOSITE STRUCTURE

Clement Paul Cueni, Arlington, and Ernest Walter, Montclair, N. J., assignors to Porete Manufacturing Company, North Arlington, N. J., a corporation of New Jersey Application March 23, 1942, Serial No. 435,808

18 Claims. (Cl. 72—70)

This invention is directed to composite structures consisting essentially of steel beams and reinforced concrete slabs supported by the same and united thereto.

More particularly, the present invention is directed to means for providing shear reinforcements in order to more securely anchor the slabs to the beams, and providing a unitary structure which is characterized by lightness and great strength.

The present application is a continuation in part of our co-pending application Serial No. 341,124, filed June 18th, 1940, entitled "Concrete constructions."

It has been customary for a number of years, to provide structures of this kind wherein the upper flanges of the steel beams were provided with shear reinforcements of a spiral nature. Such reinforcements were usually made of steel rods bent into a sinuous form or formed into spirals and welded to the top flange of the beam at spaced intervals. Such a construction has numerous advantages and has been in common use. However, because of the use of sinuous rods, it sometimes becomes difficult to insert in their proper positions, the steel reinforcements for the concrete slab. This is true particularly of the lower reinforcements for the slab.

There have also been used shear reinforcements for steel beams wherein a number of spaced elements were used, each of the elements consisting of an angle section which was welded to the top flange of the beam with one of the faces lying flat on said flange. This construction allowed the placing of the reinforcements for the concrete slabs, but had the disadvantage that there was no great resistance to certain bending moment set up by the horizontal shear on the erect member of the angle.

The present invention is intended and adapted to overcome the disadvantages of prior structures and to provide shear reinforcements secured to the steel beams which shall have adequate stiffness so as to resist lateral forces introduced in the structure and to prevent relative movement of slab and beam.

It is also among the objects of the present invention to provide shear reinforcements which are of such form and positioning as to adequately resist forces tending to lift the slab upwardly from the beam.

In the practice of the present invention we provide a steel beam and concrete slab structure of the type previously used. Shear reinforcement members are secured to the top flange of the beam at spaced intervals, usually by welding. Each of such members is provided with at least two faces of substantial extent arranged in a vertical position with respect to the top flange of the beam. Such faces are at an angle to each other, usually at right angles, so as to present a substantial surface to the horizontal forces in the concrete tending to move the slab relative to the beam. In some cases, it is highly advisable to have one of such faces in a plane parallel to the axis of the beam, and one or more faces at right angles thereto in a plane perpendicular to the axis of the beam. As an example of a highly effective form of shear reinforcements, a section of an I-beam secured to the top flange of the beam has been found highly useful. By such an arrangement, a substantial area at right angles to horizontal forces in the concrete is provided, and such area resists such forces, no matter from what direction they come. Also, because of the stiffness of an I-beam or similar section, the bending moment produced by the horizontal shear applied on the areas placed at an angle to the direction of the shear force, can easily be resisted.

In addition to the horizontal forces, there are also vertical forces which tend to lift the concrete slabs from the beams. The present invention contemplates a structure which effectively prevents such lifting. In accomplishing the same, the shear reinforcements are provided with a portion at an acute angle to the top flange of the beam, or even parallel thereto. Such a portion, when projected upon the flange of the beam, covers a substantial area. Another type of structure capable of giving the same result is one in which the shear reinforcements, instead of having their faces in planes perpendicular to the top flange, are inclined at an acute angle thereto. Thereby, there is an extended area overhanging the flange of the beam and having a substantial projected area thereon. Because of the stiffness of the shear reinforcements and the overhanging portions thereof, effective resistance to those forces which tend to lift the slab up and away from the beam, is provided.

In the accompanying drawings constituting a part hereof and in which like reference characters indicate like parts:

Figs. 9, 10, 11 and 12 are perspective views similar to Figs. 3 and 6 showing still further modifications of shear reinforcements made in accordance with the present invention.

Figure 1:
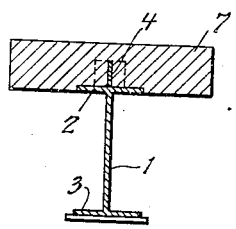
Fig. 1 is a transverse vertical cross-sectional view of a composite structure of concrete slab and steel beam.
Figure 2:
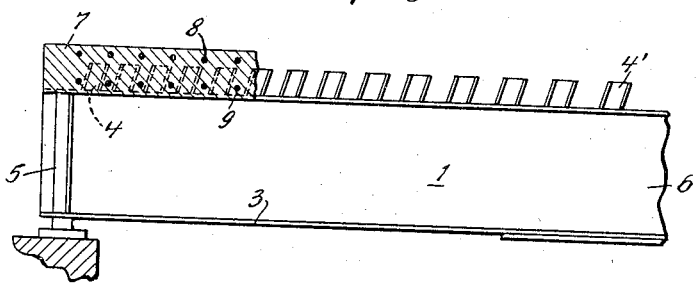
Fig. 2 is a longitudinal cross-sectional view of the structure of Fig. 1, some parts being broken away for clearness.

The structure consists generally of a steel beam 1 having a top flange 2 and a bottom flange 3. A series of I-beam sections 4 are placed on end on the flange 2 and welded thereto. As shown in Fig. 2, the shear reinforcements 4 at the end 5 of beam 1 are closely spaced and are inclined longitudinally of the beam and towards the center 6 thereof. The shear reinforcements are spaced further apart as they approach the center 6, as shown at 4'. A concrete slab 7 having usual reinforcement rods 8 and 9 is cast on the top of beam 1, whereby shear reinforcements 4 are embedded therein.

The unequal spacing of the shear reinforcements from end to end of the beam has an important advantage. The horizontal shear is greatest at the ends of the beam, and is least at the center thereof. Furthermore, the vertical component of the horizontal shear is zero at the center and increases toward the end of the beam, the horizontal direction of the shear at the center of the beam changing gradually to an upward direction toward the end of the beam. Therefore, the vertical component of the horizontal shear increases more rapidly toward the end of the beam than the horizontal shear itself. The direction of said force is from the center to the ends of the beam. Therefore, the closer spacing of the reinforcements at the ends of the beam will enable the use of considerably less steel in the reinforcements while adequately resisting the vertical and horizontal components of the force.

Figure 3:
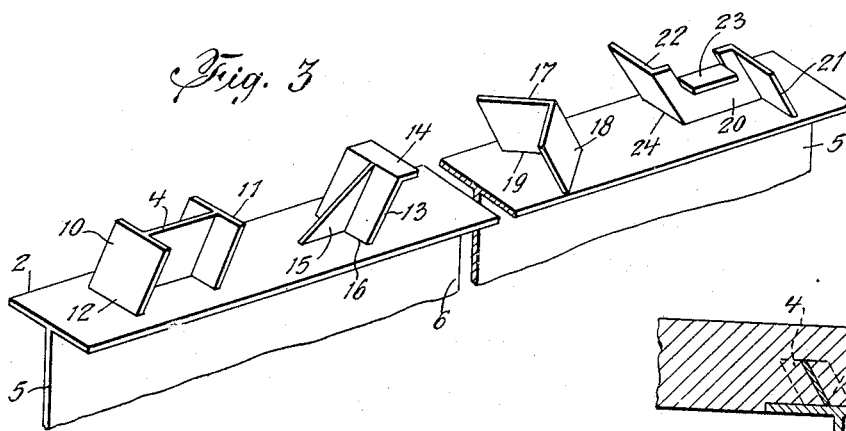
Fig. 3 is a perspective view of a beam with shear reinforcements thereon prior to the casting of the concrete slab.

The shear reinforcement 4, as shown in Fig. 3, has the usual flanges 10 and 11 which are so cut and placed that the reinforcement 4 is inclined from the end 5 of the beam to the center 6. It is welded at 12 to the flange 2 of the beam.

Another form of shear reinforcement shown in Fig. 3 has a face 13 inclined similarly to faces 10 and 11, and a top flange 14 practically parallel to flange 2. A transverse stiffening element 15 is integral with face 13 and the reinforcement is welded at 16 to the beam.

An angular form of shear reinforcement has faces 17 and 18 at right angles to each other and inclined with respect to the flange of the beam, being welded thereto at 19.

Shear reinforcement 20 has its face in a plane parallel to the longitudinal axis of the beam. Projecting in opposite directions from the ends of face 20 are faces 21 and 22 which are inclined to the vertical and towards the center of the beam. This construction is similar to the usual Z-bar. The face or web 20 is cut and bent over, as shown at 23, substantially parallel to flange 2.

Figure 4:
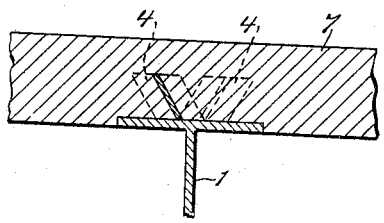
Fig. 4 is a transverse vertical fragmentary cross-sectional view of a composite structure which is a modified form of the invention as shown in Fig. 3.
Figure 5:
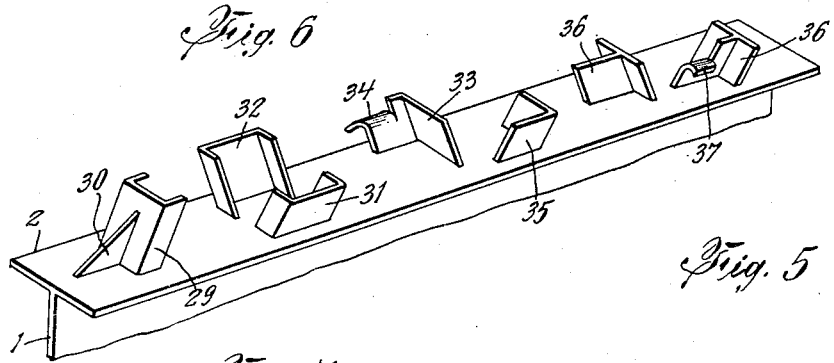
Fig. 5 is a top plan view of a beam showing several forms of shear reinforcements, one of which being that shown in Fig. 4.

In place of the longitudinal inclination of the shear reinforcements or in conjunction therewith, there may be lateral inclination thereof. In Figs. 4 and 5 there is shown the shear reinforcements 4 in staggered relation along the beam, those on one side of the beam being inclined laterally towards that side, and those on the other side being inclined laterally towards the latter side, all being also inclined longitudinally. Another form, as shown in Fig. 5, consists of channel members 25 and 26, the members 25 being inclined towards the left and the members 26 being inclined towards the right of Fig. 5. A still different form, being a modified T-section, is shown at 27 and 28, these elements being similarly inclined both longitudinally and laterally.

Figure 6:
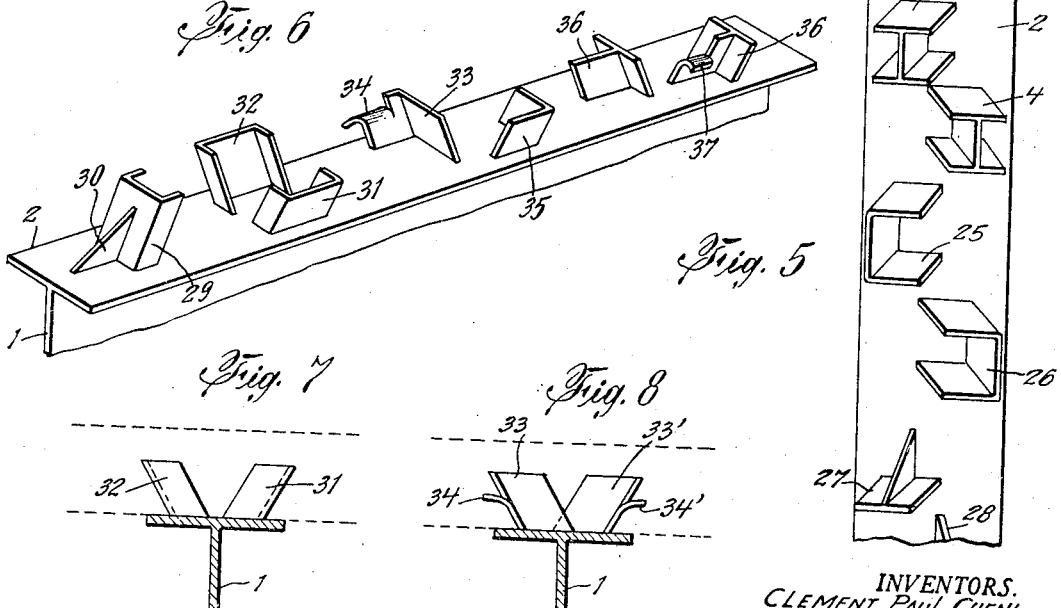
Fig. 6 is a view similar to Fig. 3 showing a number of other modifications of shear reinforcements coming within the scope of the present invention.

Fig. 6 shows a channel member 29 welded to beam 1 with the inclination in a longitudinal direction and having a stiffening member 30 welded to the web of the channel.

Channels 31 and 32 are arranged in laterally adjacent positions on beam 1, being inclined in opposite directions towards the lateral edges of the beam. Angle member 33 has one of the faces thereof cut and bent over as shown at 34, whereby there is provided not only the lateral inclination of the shear reinforcements, but also the overhanging to act as an additional anchorage. Angle 35 is similar to 33, except that it does not have an overhanging portion. Shear reinforcement 36, in the form of a T, is inclined as shown and has one web parallel to and the other approximately perpendicular to the beam axis. Shear reinforcement 36 may be inclined laterally as shown at the right of Fig. 6 and may have an overhanging portion 37.

Figure 7:
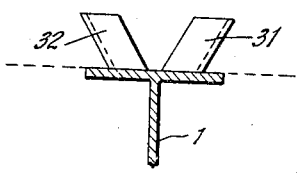
Fig. 7 is a transverse cross-sectional view taken through the beam of Fig. 6.
Figure 8:
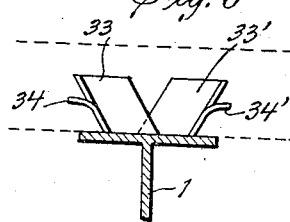
Fig. 8 is a view similar to Fig. 7 showing a different type of shear reinforcements.

Fig. 7 shows a cross-section of beam 1 in Fig. 6 near the channels 31 and 32 and Fig. 8 shows a similar cross-section near angle 33. Both cross-sections show that the lateral inclination of the shear reinforcements provide a dove-tailed connection between the beam and the concrete slab well able to prevent a lateral rotation of the slab around the beam flange. Such a well-anchored slab has more strength to transmit a load applied on it between two beams. It also is obvious that such a dove-tailed connection does effectively prevent the slab from lifting up, away from the steel section, and for that result does not depend on the bond of the concrete to the faces of the shear reinforcements.

In Fig. 9 a somewhat different type of shear reinforcement is shown. There is provided the I-section 4 having its flanges 10 and 11 welded at one end to the face of top flange 2. It differs from that shown in Fig. 3 in that there is no inclination to the vertical. This form does not have the advantage of preventing the lifting of the slab, but has the other feature of providing stiffness to the shear reinforcement against a bending force. Another form shown in Fig. 9 has a web 38 in a plane parallel to the beam axis and webs 39 and 40 at right angles thereto. The other form shown has the web 41 similar to 38 and extensions 42 and 43 perpendicular thereto and extending in opposite directions.

In Fig. 10 there is shown a special form 44 which may be considered as a modified channel. 45 is a semi-cylindrical member welded to the face of flange 2. 46 is a T-section having lateral stiffness, but not as effective as I-beam 4. 47 is a rail section which may be considered as an I-beam with unequal faces.

The modifications shown in Fig. 11 include not only stiffening members, but also overhanging portions to prevent lifting. The I-beam 48 has a portion of the central web 49 bent over to form such an anchorage. I-beam 50 has portions 51 and 52 bent outwardly for the same purpose. Angle member 53 has portions 54 bent from each of the faces thereof. T member 55 has a horizontal extended portion 56 at the top thereof. Semi-cylindrical member 57 has horizontally bent portions 58 at the opposite sides thereof.

Other special forms are shown in Fig. 12. Channel 59 is placed so that one of the flanges 60 thereof is in a horizontal position and a stiffening web 61 forms part thereof. Z member 62 has a similar flange 60 and stiffener 61. Angle member 63 has an overhanging extension 64 at the top thereof.

All the above described forms are embraced within the principles set forth herein and illustrate the wide application of the principles of the present invention. All of them are so formed that they provide added resistance and stiffness against forces which tend to bend the shear reinforcements longitudinally and laterally. Thus the new form of shear reinforcements provide a closer union between the concrete and steel members and greatly strengthen and stiffen the structures. The provision of surfaces inclined to the top flange of the beams and also the overhanging portions of the shear reinforcements effectively prevent the lifting of the slab from the beam. The spaced positioning of the shear reinforcements allows the introduction of the reinforcing members for the concrete slabs, particularly the lower reinforcements and the intermediate reinforcements.

It will be apparent to those skilled in the art that the illustrations of different forms of shear reinforcements do not limit the forms which may be used. The same anchorage as with the hooks can be effected by welding a plate on top of the semi-cylindrical member 45, or by using a section of a hollow sphere, for example a quarter thereof formed by cutting the sphere in two directions at right angles to each other. Various other forms will suggest themselves. They may be pressed from flat plates. The positioning of the reinforcements may be varied and may differ in detail from the above illustrations. For instance, some of the members instead of being inclined laterally and outwardly, may be inclined laterally and inwardly towards the central axis of the beam.

In the claims the term "structural shape" is intended to include not only the standard commercial shapes, but also many others which vary therefrom or which have added elements, as described herein. The term "faces at an angle" is intended to also cover such forms as shown at 45, wherein an infinite number of faces meet at angles.

The invention contemplates shear reinforcements which are adapted to resist not only the vertical component of the shear force, but also the horizontal component and the bending moment produced by it. The shear reinforcements also resist the rotational movement of the slab or the beam. In view of the above, the invention is to be broadly construed and not to be limited except by the claims appended hereto.

What is claimed is:

1. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, each of said members having a face opposing forces applied longitudinally, laterally and vertically of said beam and having a web thereof acting as a stiffening element for said face, whereby said members have resistance to bending moments.

2. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, one of said faces being approximately parallel to the web of said beam, and at least one other face being at about right angles to said first face, each of said members having a face opposing forces applied longitudinally, laterally and vertically of said beam and having a web thereof acting as a stiffening element for said face, whereby said members have resistance to bending moments.

3. In a composite structure comprising a beam having a top flange, shear reinforcing members in spaced relation fixed to said flange, and a concrete slab resting on and united with said flange of said beam having said members imbedded therein, the improvement wherein each of said members is a structural shape in the form of an I-beam, one end thereof being secured to said flange so that the web extends upwardly therefrom, each of said members having a face opposing forces applied longitudinally, laterally and vertically of said beam and having a web thereof acting as a stiffening element for said face, whereby said members have resistance to bending moments.

4. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, one of said faces being approximately parallel to the web of said beam, and additional faces at the ends of said first face at about right angles to said first face, each of said members having a face opposing forces applied longitudinally, laterally and vertically of said beam and having a web thereof acting as a stiffening element for said face, whereby said members have resistance to bending moments.

5. In a composite structure comprising a beam having a top flange, shear reinforcing members in spaced relation fixed to said flange, and a concrete slab resting on and united with said flange of said beam having said members imbedded therein, the improvement wherein each of said members has at least one face at such an angle to the vertical as to have a substantial projected area on said flange, said shear reinforcements having stiffening members to resist a substantial bending movement, each of said members having a face opposing forces applied longitudinally, laterally and vertically of said beam and having a web thereof acting as a stiffening element for said face, whereby said members provide resistance opposing the tendency of the slab to lift up and away from said beam.

6. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, and each of said members has at least one face at such an angle to the vertical as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam.

7. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam.

8. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam, the inclination of said members being longitudinally of the beam axis and towards the center thereof.

9. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, whereby said members provide resistance opposing the tendency of the slab to lift up and away from said beam, said members being more closely spaced at the ends of said beam, each of said members having a face opposing forces applied longitudinally, laterally and vertically of said beam and having a web thereof acting as a stiffening element for said face, whereby they more effectively resist the vertical component of the shear force.

10. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, said shape being an I-beam in cross-section, each of said members having a face opposing forces applied longitudinally, laterally and vertically of said beam and having a web thereof acting as a stiffening element for said face, whereby said members provide resistance opposing the tendency of the slab to lift up and away from said beam.

11. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, said shape having at least two faces at about right angles to each other, each of said members having a face opposing forces applied longitudinally, laterally and vertically of said beam and having a web thereof acting as a stiffening element for said face, whereby said members provide resistance opposing the tendency of the slab to lift up and away from said beam.

12. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam, the inclination of said members being laterally of the beam axis.

13. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam, the inclination of said members being laterally of the beam axis, alternate members being inclined to one side and the other of said beam.

14. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, each of said members having a face opposing forces applied longitudinally, laterally and vertically of said beam and having a web thereof acting as a stiffening element for said face, whereby said members provide resistance opposing the tendency of the slab to lift up and away from said beam, the inclination of said members being laterally of the beam axis, said members being arranged in laterally adjacent pairs, one member of each pair being inclined to one side and the other member being inclined to the other side of said beam.

15. In a composite structure comprising a beam having a top flange, shear reinforcing members in spaced relation fixed to said flange, and a concrete slab resting on and united with said flange of said beam having said members imbedded therein, the improvement wherein each of said members is a structural shape having one end secured to said flange, said shape being inclined to the vertical so as to have a substantial projected area on said flange, the inclination being both longitudinally of the beam axis and laterally thereof, each of said members having a face opposing forces applied longitudinally, laterally and vertically of said beam and having a web thereof acting as a stiffening element for said face, whereby said members provide resistance opposing the tendency of the slab to lift up and away from said beam.

16. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, said faces merging into each other to provide a curved surface, each of said members having a face opposing forces applied longitudinally, laterally and vertically of said beam and having a web thereof acting as a stiffening element for said face, whereby said members have resistance to bending moments.

17. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces at an angle to each other, one end thereof being secured to said flange so that the faces extend upwardly therefrom, a portion of at least one face being cut and bent over so as to have a substantial projected area on said flange, each of said members having a face opposing forces applied longitudinally, laterally and vertically of said beam and having a web thereof acting as a stiffening element for said face, whereby said members have resistance to bending moments.

18. In a composite structure comprising a beam having a top flange, shear reinforcing members in spaced relation fixed to said flange, and a concrete slab resting on and united with said flange of said beam having said members imbedded therein, the improvement wherein each of said members is a structural shape having at least two faces presented to shear forces at right angles to each other, said faces extending upward at right angles to said flange, the lower edges of said faces being permanently united with the top surface of said flange, at least one of said faces being a stiffening element for another face, whereby said members have resistance to bending moments.

ERNEST WALTER.
CLEMENT PAUL CUENI.